(12) United States Patent
LaCous

(10) Patent No.: US 8,214,652 B2
(45) Date of Patent: Jul. 3, 2012

(54) BIOMETRIC IDENTIFICATION NETWORK SECURITY

(75) Inventor: Mira LaCous, Eagan, MN (US)

(73) Assignee: BIO-key International. Inc., Eagan, MN (US)

( * ) Notice: Subject to any disclaimer, the term of this patent is extended or adjusted under 35 U.S.C. 154(b) by 340 days.

(21) Appl. No.: 12/132,167

(22) Filed: Jun. 3, 2008

(65) Prior Publication Data

US 2008/0270787 A1 Oct. 30, 2008

Related U.S. Application Data

(63) Continuation of application No. 11/540,010, filed on Sep. 29, 2006, now Pat. No. 7,415,605, which is a continuation-in-part of application No. 10/442,005, filed on May 20, 2003, now Pat. No. 7,117,356.

(60) Provisional application No. 60/382,282, filed on May 21, 2002.

(51) Int. Cl.
*H04L 9/00* (2006.01)
*H04L 9/08* (2006.01)
*H04K 1/00* (2006.01)
*G06F 7/04* (2006.01)
*G06K 9/00* (2006.01)
*G06Q 20/00* (2012.01)
*H04N 7/16* (2011.01)
*G07C 9/00* (2006.01)
*G06Q 30/00* (2012.01)
*G06K 19/07* (2006.01)
*H04L 29/06* (2006.01)
*H04L 9/32* (2006.01)

(52) U.S. Cl. ............ 713/186; 713/150; 726/5; 380/281; 340/5.53; 382/125; 725/25; 705/67

(58) Field of Classification Search .................. 713/186, 713/150; 726/5; 380/281; 340/5.53; 382/125; 725/25; 705/67

See application file for complete search history.

(56) References Cited

U.S. PATENT DOCUMENTS 3,959,884 A 6/1976 Jordan et al. .................... 283/69
(Continued)

FOREIGN PATENT DOCUMENTS

WO WO 01/99337 A 12/2001
(Continued)

OTHER PUBLICATIONS

Nguyen Thi Hoang Lan; Nguyen Thi Thu Hang; "An approach to protect Private Key using fingerprint Biometric Encryption Key in BioPKI based security system"; Control, Automation, Robotics and Vision, 2008. ICARCV 2008. 10th International Conference; Publication Year: Dec. 2008 , pp. 1595-1599.*

(Continued)

*Primary Examiner* — Eleni Shiferaw
*Assistant Examiner* — Courtney Fields
(74) *Attorney, Agent, or Firm* — Westman, Champlin & Kelly, P.A.

(57) ABSTRACT

Systems and methods for regulating user access in the context of a biometric security system are disclosed. One method disclosed includes receiving a remotely transmitted data packet containing an encryption key, utilizing a decryption component to decrypt the data packet, and utilizing the encryption component to encrypt biometric data. Another method disclosed includes utilizing a processor, within a client computing device, to perform an encryption function within a biometric security system, wherein the encryption function is incorporated into an authentication process that involves a transfer of biometric information between the client computing device and a remotely implemented server.

13 Claims, 12 Drawing Sheets

U.S. PATENT DOCUMENTS

| | | | | |
|---|---|---|---|---|
| 4,151,512 | A | 4/1979 | Riganati et al. | 382/125 |
| 4,185,270 | A | 1/1980 | Fischer II et al. | 382/125 |
| 4,607,384 | A | 8/1986 | Brooks | 382/124 |
| 4,790,564 | A | 12/1988 | Larcher et al. | 283/69 |
| 5,105,467 | A | 4/1992 | Kim et al. | 382/125 |
| 5,140,642 | A | 8/1992 | Hsu et al. | 382/124 |
| 5,261,008 | A | 11/1993 | Yamamoto | 382/127 |
| 5,572,597 | A | 11/1996 | Chang et al. | 382/125 |
| 5,631,971 | A | 5/1997 | Sparrow | 382/125 |
| 5,659,626 | A | 8/1997 | Ort et al. | 382/125 |
| 5,664,027 | A | 9/1997 | Ittner | 382/170 |
| 5,841,888 | A | 11/1998 | Setlak et al. | 382/124 |
| 5,901,239 | A | 5/1999 | Kamei | 382/125 |
| 6,002,787 | A | 12/1999 | Takhar et al. | 382/125 |
| 6,049,621 | A | 4/2000 | Jain et al. | 382/125 |
| 6,052,468 | A * | 4/2000 | Hillhouse | 380/281 |
| 6,072,895 | A | 6/2000 | Bolle et al. | 382/125 |
| 6,167,517 | A * | 12/2000 | Gilchrist et al. | 713/186 |
| 6,181,807 | B1 | 1/2001 | Setlak et al. | 382/124 |
| 6,226,391 | B1 | 5/2001 | Dydyk et al. | 382/125 |
| 6,233,348 | B1 | 5/2001 | Fujii et al. | 382/125 |
| 6,241,288 | B1 | 6/2001 | Bergenek et al. | 283/67 |
| 6,256,737 | B1 * | 7/2001 | Bianco et al. | 713/186 |
| 6,263,438 | B1 | 7/2001 | Walker et al. | 713/178 |
| 6,289,112 | B1 | 9/2001 | Jain et al. | 382/116 |
| 7,117,356 | B2 | 10/2006 | LaCous | |
| 7,415,605 | B2 | 8/2008 | LaCous | |
| 7,505,941 | B2 * | 3/2009 | Bishop et al. | 705/67 |
| 7,970,186 | B2 * | 6/2011 | Bauchspies | 382/125 |
| 2001/0007127 | A1 | 7/2001 | Staring | 713/160 |
| 2001/0048359 | A1 * | 12/2001 | Yamane et al. | 340/5.53 |
| 2002/0031245 | A1 | 3/2002 | Rozenberg et al. | 382/125 |
| 2002/0041700 | A1 | 4/2002 | Therbaud | 382/124 |
| 2002/0076054 | A1 | 6/2002 | Fukutomi et al. | 380/277 |
| 2003/0033545 | A1 * | 2/2003 | Wenisch et al. | 713/202 |
| 2010/0070989 | A1 * | 3/2010 | Lev | 725/25 |

FOREIGN PATENT DOCUMENTS

| | | |
|---|---|---|
| WO | WO 02/32308 A | 4/2002 |
| WO | WO 2008111012 A1 * | 9/2008 |

OTHER PUBLICATIONS

Practical Image Processing Inc. By Craig A. Lindley Published by John Wiley & Sons, Inc. 1991.

European Search Report.

Schneier, B.; "Applied Crytography, Passe" Applied Crytography, Protocols, Algorithms and Source Code in C, New York, NY. John Wiley & Sons, 1996, pp. 176-177.

Official European Search Report.

* cited by examiner

BIOMETRIC IDENTIFICATION NETWORK SECURITY

CROSS-REFERENCE TO RELATED APPLICATION(S)

This application is a continuation application of, and claims priority of, U.S. patent application Ser. No. 11/540,010, filed Sep. 29, 2006, now U.S. Pat. No. 7,415,605, issued Aug. 19, 2008, which is an application that is a Continuation-In-Part of, and claims priority of, U.S. patent application Ser. No. 10/442,005, filed May 20, 2003, now U.S. Pat. No. 7,113,356, issued Oct. 3, 2006, which claims benefit of U.S. Provisional Application Ser. No. 60/382,282 filed on May 21, 2002, and entitled "BIOMETRIC SECURITY SYSTEMS AND METHODS", the contents of which are all hereby incorporated by reference in their entirety.

BACKGROUND OF THE INVENTION

The present invention generally pertains to biometric security systems. More specifically, the present invention pertains to biometric security systems that provide an enhanced defense against unlawful hackers and other system attackers.

Within a typical biometric security system, there are at least two operations, enrollment and authentication. The operation of enrollment encompasses the original sampling of a person's biometric information, and the creation and storage of a match template (a.k.a., an enrollment template) that is a data representation of the original sampling. The operation of authentication includes an invocation of a biometric sample for the identification or verification of a system user through comparison of a data representation of the biometric sample with one or more stored match templates.

Biometric information is, by nature, reasonably public knowledge. A person's biometric data is often casually left behind or is easily seen and captured. This is true for all forms of biometric data including, but not limited to, fingerprints, iris features, facial features, and voice information. As an example, consider two friends meeting. The one friend recognizes the other by their face and other visible key characteristics. That information is public knowledge. However, a photo of that same person 'is' not that person. This issue similarly applies, electronically, to computer-based biometric authentication wherein a copy of authorized biometric information is susceptible to being submitted as a representation of the corresponding original information. In the context of biometric security applications, what is important, what enables a secure authentication, is a unique and trusted invocation of an authorized biometric.

A key issue confronting biometric authentication for security applications is providing some sort of assurance that the biometric sample being processed during authentication is a true and trusted sample. Numerous known biometric security systems are susceptible to being duped because a data representation received by a security processor during authentication is actually a fraudulent invocation of biometric information. For example, an individual in possession of a copy of authorized biometric information can submit the copy during authentication to gain unauthorized access. In a particularly dangerous scenario, an individual in possession of an electronic copy of authorized biometric information can fraudulently bypass the physical collection of biometric information and directly submit the copy to an electronic security processor during the operation of authentication to gain unauthorized access.

To ensure a trusted invocation of biometric information, data integrity should be maintained during each stage or level of the authentication process. The integrity of any transfers of information between a capture device and a processor, and between a processor and any subsequent applications, should be maintained. In particular, the processor responsible for receiving and processing biometric information submitted by a user should be able to 'trust' the biometric data it receives. In other words, there should be a trusted relationship between a device that gathers a user's biometric information (i.e., a fingerprint scanner) and a security processor responsible for processing that biometric information.

Ensuring that access is granted only upon unique and trusted invocations of authorized biometric information is a challenge relevant to most all biometric security systems.

SUMMARY OF THE INVENTION

One embodiment pertains to a method for regulating user access in the context of a biometric security system. The method includes receiving a remotely transmitted data packet containing an encryption key, utilizing a decryption component to decrypt the data packet, and utilizing the encryption component to encrypt biometric data. Another embodiment includes providing, within a client computing device, a processor that is implemented as part of a trusted computing environment, and utilizing the processor to perform an encryption function within the biometric security system, wherein the encryption function is incorporated into an authentication process that involves a transfer of biometric information between the client computing device and a remotely implemented server.

DETAILED DESCRIPTION OF ILLUSTRATIVE EMBODIMENTS

I. Illustrative Contextual Environments

Figure 1:
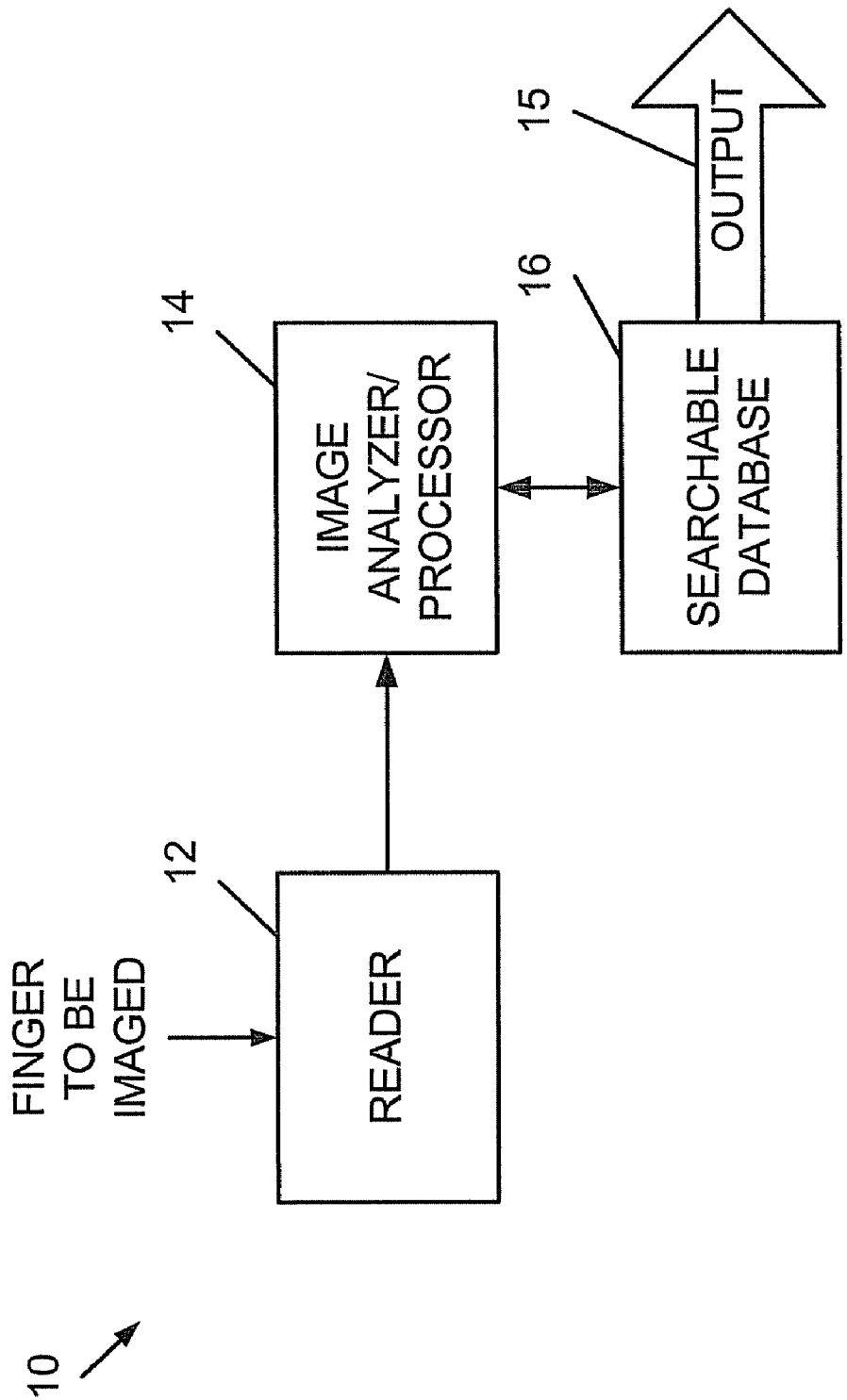
FIG. 1 is a block diagram of a user authentication system.

Various aspects of the present invention pertain to biometric security systems that provide an enhanced defense against unlawful hackers and other system attackers. The concepts of the present invention are designed to operate in conjunction with a broad range of general security applications, including but not limited to physical access security applications, computer network security applications, individual computer security applications, Internet based applications and systems, security applications and other general security applications. The methods and systems of the present invention are also generally suitable for improving the performance and reliability of user authentication systems.

Embodiments of the present invention can be specifically implemented to enhance security provided in association with a variety of access points. Some of these access points are associated with a physical space, such as a building, a room, a particular airport terminal, an airplane, etc. In accordance with one embodiment, a biometric scanner is physically positioned within an unsecured area, while access to a separated secured area is denied to anyone who is unable to present authorized biometric information to the biometric scanner for processing by an associated access control program. In accordance with another embodiment, a biometric scanner is physically positioned on an unsecured side of a locked door that remains locked until authorized biometric information is received by the biometric scanner and adequately processed by an associated access control program.

Embodiments of the present invention can also be implemented to enhance security provided in association with electronic access points. Through interaction with a computing device, a user is able to encounter a wide variety of functional and informational access points or transaction access points, most all of which can potentially be secured with the systems and methods associated with the present invention.

A potentially securable electronic access point is encountered when a user is presented with an ability to gain general access to a particular computer network (e.g., a particular LAN, the Internet, etc.). Another potentially securable electronic access point is encountered when a user is presented with an ability to access a particular collection of information (e.g., medical records, account information, personnel information, protected data files, etc.) that is stored on the computing device with which the user is interacting, or is accessibly stored on a remote computing device. Another potentially securable electronic access point is encountered when a user is presented with an ability to access and operate a particular program that is stored on the computing device with which the user is interacting, or is accessibly stored on a remote computing device. Still other potentially securable electronic access points are encountered when a user is presented with an ability to access information stored within a particular file or directory, or an ability to access a class of information that is identified in a particular manner (e.g., confidential), or an ability to utilize functions associated with another independent device (e.g., a particular camera, scanner, cash drawer, vault, etc). These are only a few of many electronic access points that could be secured utilizing the systems and methods of the present invention.

The present invention is useful with various types of biometric technology. Specific technologies include iris or retina eye-scan technology, voice technology, face technology, hand geometry technology, DNA technology, spectral biometric technology and fingerprint technology, for example. To the extent that the present description describes a fingerprint-based system, such description is intended to be but one example of a suitable system. The scope of the present invention is not so limited.

II. Illustrative Operational Environment

FIG. 1 is a block diagram of a user authentication system 10. User authentication system 10 includes a reader portion 12, image analyzer/processor 14 and searchable database 16, which further includes an output 15. Reader portion 12 could be any of a number of known systems capable of scanning an image of a fingerprint and transferring data pertaining to the image to an image analyzer, such as image analyzer/processor 14.

In many cases, reader portion 12 will include an optical or electronic device that includes a platen designed to receive the finger to be imaged, and a digitized image is produced. The reader commonly uses light or electricity to image the finger's pattern. Finally, the digitized image is transferred out of the reader portion to an image analyzer/processor 14. Image analyzer/processor 14 varies with application, but generally analyzes the image data received for a wide variety of purposes and applications.

Image analyzer/processor 14 is illustratively configured to create an authentication model (a.k.a., image model) based on the particular features and characteristics of images received from reader portion 12. In accordance with one embodiment, authentication models are more than facsimiles of their associated fingerprint images and include a unique range of data elements that provide various analytical opportunities. Authentication model creation is described in U.S. patent application Ser. No. 09/991,589, filed on Nov. 16, 2001, entitled IMAGE IDENTIFICATION SYSTEM, which is owned by the present Applicant, and the contents of which are hereby incorporated by reference in their entirety.

In one embodiment, image analyzer/processor 14 directly or indirectly compares data elements of a generated authentication model to data elements of at least one other authentication model stored within searchable database 16. The authentication models stored in database 16 illustratively correspond to previously obtained scanned images, while the authentication model being compared illustratively corresponds to a contemporaneously scanned image. User authentication system 10 is configured to efficiently make a determination as to whether the authentication model corresponding to the contemporaneously scanned fingerprint is substantially similar to any of the authentication models (or directly related data collections) included within the searchable database 16. In this manner, user authentication system 10 provides an efficient and accurate fingerprint image identification system. Such a system is used, for instance, as a security measure to determine whether the person who places a finger on the reader portion 12 should be authorized to enter a room, to access a bank account or to take any other variety of actions.

As is shown in FIG. 1, searchable database 16 includes an output 15. The precise nature of output 15 depends on the context within which user authentication system 10 is to be applied. For instance, output 15 could be a positive or negative match indication, or an identification indicator of an authentication model or data collection contained in searchable database 16 that substantially matches or corresponds to the image scanned by reader portion 12. These are but several examples of the many potential forms of output 15. In addition, output 15 can include data to be communicated to an application.

III. Operational Overview

Figure 2:
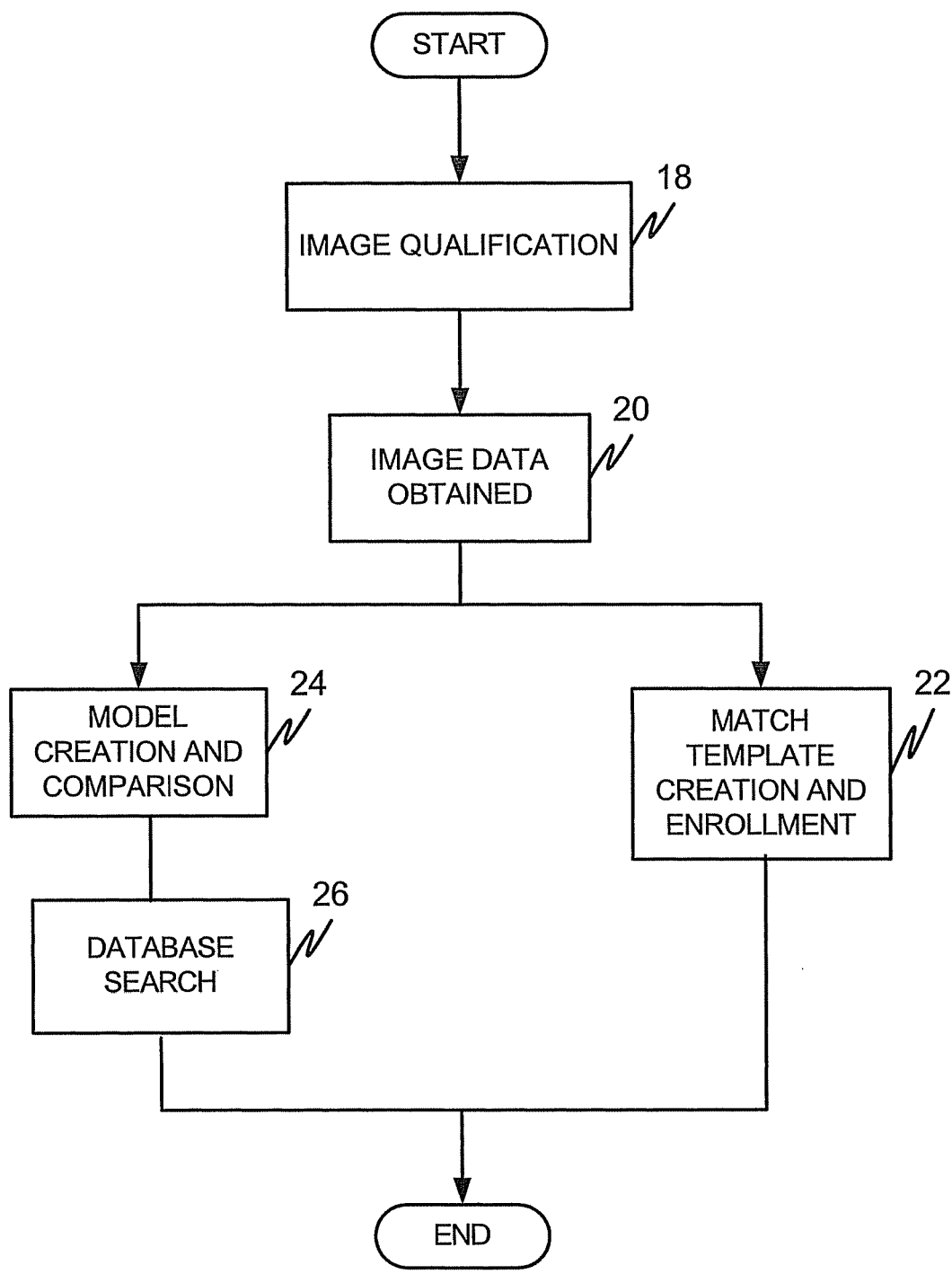
FIG. 2 is a flow diagram illustrating operations performed in association with the biometric security system.

FIG. 2 is a flow diagram illustrating operations to be carried out within system 10, for example within analyzer/processor 14, in accordance with an embodiment of the present invention. The process begins when image analyzer/processor 14 receives image data from reader portion 12. After receiving image data, image analyzer/processor 14 illustratively first performs, as is indicated by block 18 in FIG. 2, a series of image qualification functions.

Briefly, image qualification 18 involves quickly processing all or part of the available image data to ensure that the received image is a scan of a real fingerprint (as opposed to a fraudulent fingerprint) and of sufficient quality to proceed with processing. In one embodiment, if the image qualification process leads to the conclusion that the scanned image is fraudulent or of insufficient quality, then processing of the image is interrupted. In such a case, the system user is provided with feedback pertaining to identified inadequacies and is allowed to continue processing only when the inadequacies have been corrected.

Block 20 in FIG. 2 represents the point at which qualified image data has been obtained. After qualified image data has been obtained, the image data is utilized for at least one of two purposes. First, as is indicated by block 22, is match template creation and enrollment. Block 22 represents a process in which match templates are generated (i.e., based on digitized qualified image data) and entered into and catalogued within searchable database 16. In one embodiment, the match templates are stored in a searchable database store corresponding to database search 26. In this manner, database search 26 performs search operations including at least some match templates created at block 22.

In accordance with one embodiment, match templates and authentication models are generated in accordance with the same algorithm or two substantially similar algorithms such that they are produced in the same or a substantially similar format. In accordance with one embodiment; however, match templates are generated utilizing an algorithm that is substantially different than the algorithm utilized to generate authentication models. Accordingly, an authentication model and a match template generated based on the same data will be related but not identical. This enables an indirect, relationship-based comparison process during authentication. This process is the subject of a co-pending application that is owned by the present Applicant.

As is indicated by block 26 in FIG. 2, a database search 26 can be performed in association with model comparison 24 to determine which, if any, of multiple match templates stored in the searchable database adequately match a generated authentication model. Illustratively, database search 26 is a quick and efficient determination as to which, if any, of potentially thousands, or even millions, of enrollment templates (or data collections related thereto) within database 16 exhibit a desired level of similarity, as compared to a target authentication model. Search can be done by biometric information alone, or by some identifier like employee ID, User ID, account number, etc. In accordance with one embodiment, an identifier (i.e., an employee ID, User ID, account number, etc.) is utilized to select a single collection of data to be compared to a target authentication model on a one-to-one basis. The target authentication model is illustratively an authentication model associated with a contemporaneously scanned image.

In accordance with one embodiment, rather than comparing authentication models directly to match templates, a set of database keys that describe different match template characteristics are defined to facilitate general rather than specific comparisons to be made during the database search 26 process.

The foundation of the security provided lies in the ability to obtain a unique and trusted invocation of the user's biometric data. Accordingly, the process of generating an authentication model based on a user's biometric information should be protected, trusted and secured. The authentication model must be trusted as a true representation of the user's newly presented biometric information (i.e., a live invocation). The analyzer/processor must be able to 'trust' the biometric data it receives. Preventing the authentication model data from being replayed (i.e., electronic replay) is paramount.

IV. Enhanced Authentication Security

Figure 3:
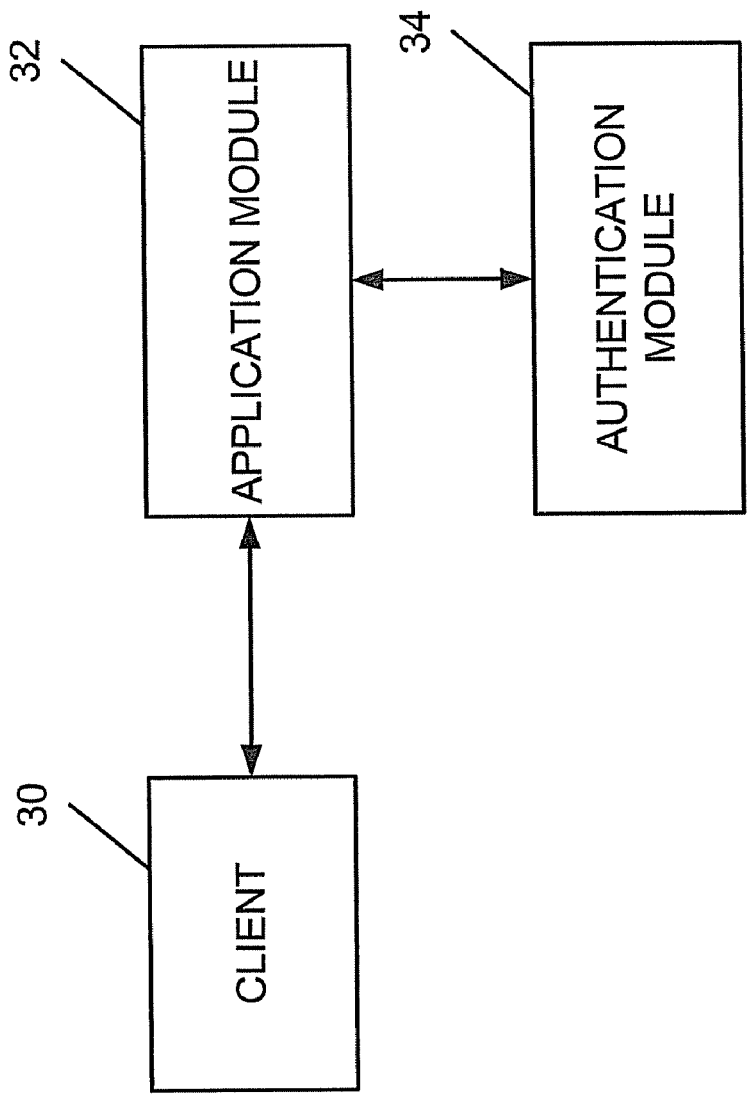
FIG. 3 is a block diagram of a particular illustrative environment wherein a client is utilized to access an application that is protected by an access control system that includes an authentication module.

User authentication system 10 (FIG. 1) may be incorporated into a variety of different general security environments. One illustrative environment exists wherein a client computing device is instructed to access some sort of application that is protected by an access control system that includes an authentication module. FIG. 3 illustrates a general block diagram of such an environment.

With reference to FIG. 3, a client 30 is illustratively instructed (e.g., directed by a user) to access an application module 32 (e.g., instructed to utilize module 32 to access a particular collection of data). Client 30 illustratively includes a reader 12 and image analyzer/processor 14 as described above in relation to FIG. 1. Accordingly, client 30 is configured to receive biometric information from the user and generate an authentication model as has been previously described.

Application module 32 illustratively can be any sort of application including but not limited to a database application, a web site application, an e-mail application, a web browser application, a word processing application, a spreadsheet application, a government application, or a physical or electronic access control application. Some aspect of application module 32 (or of data accessibly associated therewith) is illustratively of a sensitive nature, thereby making it desirable that access thereto be granted only to authorized clients and/or users. In order to enable access to be selectively granted and denied, application module 32 cooperates with authentication module 34 to facilitate a screening of the identity of client 30 and/or an associated user. Authentication module 34 illustratively includes searchable database 16 as described above in relation to FIG. 1.

In accordance with one aspect of the present invention, client 30 facilitates generation of an authentication model, and then transmission of the authentication model to authentication module 34. Authentication module 34 then evaluates the authentication model (e.g., identifies whether it is affiliated with an authorized user having biometric information enrolled within database 16). Once this evaluation is complete, a result is sent to application module 32, which illustratively grants or denies access in accordance therewith. Those skilled in the art will appreciate that the various illustrated modules may be associated with one computer device or distributed across a plurality of computer devices. The plurality of computer devices may extend across one or more computer networks, including but not limited to the Internet.

Figure 4:
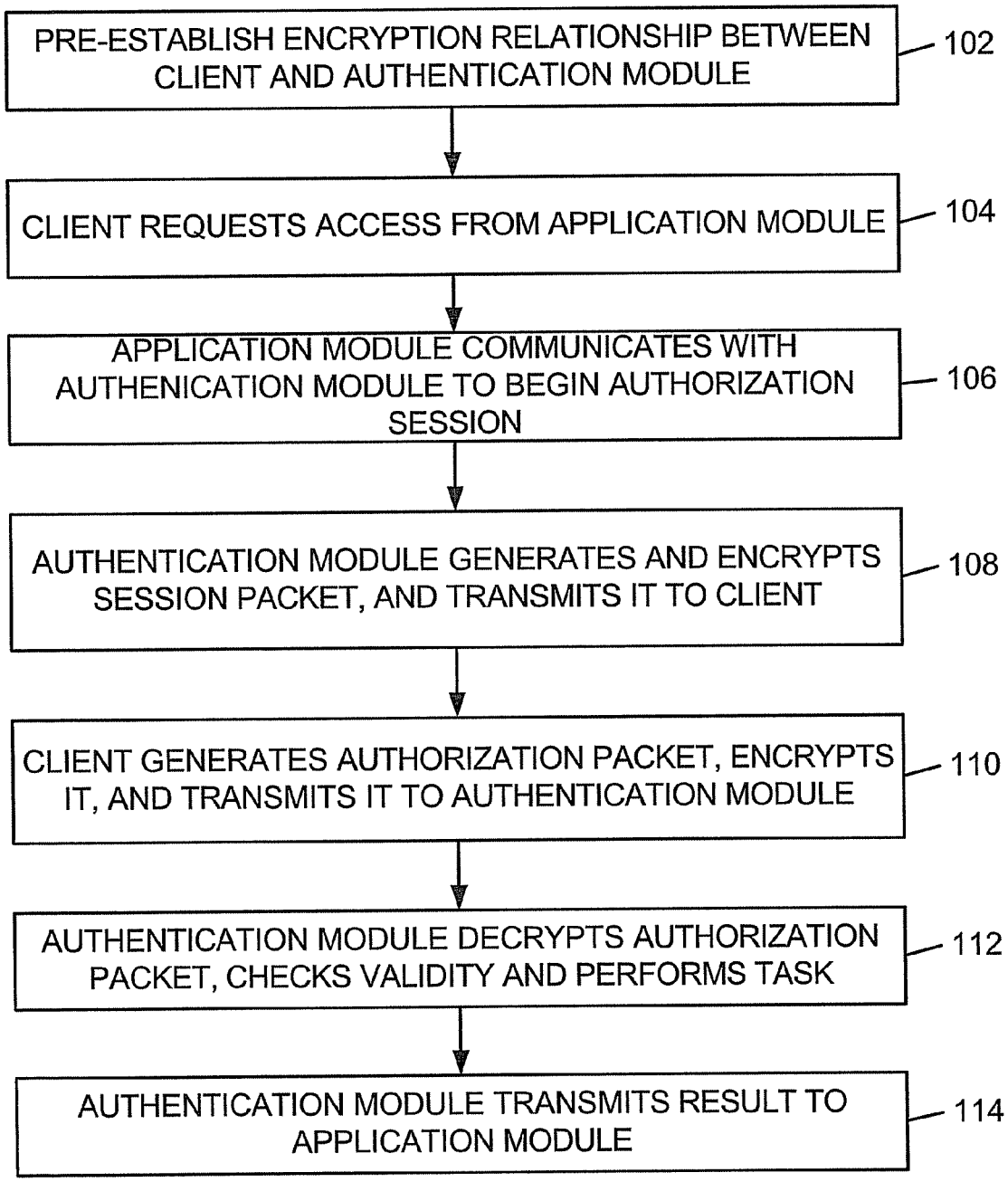
FIG. 4 is a flow diagram illustrating operations performed to enhance the level of security provided by a user authentication system.

FIG. 4, in accordance with one aspect of the present invention, illustrates a method for enhancing the level of security provided in the context of the above-described authentication processes. The method of FIG. 4 is generally applicable within the environmental considerations discussed in relation to FIG. 3.

Initially, as is indicated at step 102, an encryption relationship is pre-established between client 30 and the authentication module 34. In one mode of operation, each of the client 30 and the authentication module 34 has a stored encryption component (e.g., an encryption component operably stored with an associated specialized software component). The encryption component associated with client 30 is directly affiliated with the encryption component associated with authentication module 34 (e.g., one of the encryption components is utilized to decrypt information that has previously been encrypted utilizing the other encryption component).

In accordance with one embodiment, the encryption component associated with client 30 is a first part of a PKI key pair and the encryption component associated with authentication module 34 is a second part of the key pair. One of the first and second parts of the PKI key pair is illustratively a private encryption key and the other is illustratively a corresponding public encryption key. Related encryption component pairs other than a PKI pair (e.g., a predetermined related static key pair) could be utilized without departing from the scope of the present invention.

After an encryption relationship has been pre-established between client 30 and authentication module 34, the next step, in accordance with step 104 in FIG. 4, is for client 30 to request access from application module 32. In accordance with one embodiment, the request corresponds to a command or similar interaction initiated by a user. Once access has been requested, assuming that the requested access involves restricted or secured rights, the application module 32 then communicates with the authentication module 34 to initiate an authorization session at step 106. Illustratively, an authorization session opens upon initiation and closes after a predetermined time period. The predetermined time period is illustratively chosen to be about as long, with whatever lead or support time is required, as it takes to complete an authorization process (the authorization process is described in detail below). In accordance with one embodiment, the predetermined time period is chose to be about as long as it would take an average user to participate in and complete the authorization process.

At step 108, The authentication module 34 then generates a session packet. A session packet illustratively includes two items. The first included item is a session number, which is a unique, illustratively non-consecutively generated, number that is created for each session packet. A session packet is created for each initiated session. A session is initiated for each request for access to a secured item. A second item included in a session packet is one portion of a PKI key pair, illustratively a public key portion.

After the session packet has been generated, it is encrypted utilizing the pre-established encryption component associated with authentication module 34. The encrypted session packet is then transmitted to client 30. A copy of the session number is illustratively retained with the authentication module. A private key is also retained. The private key illustratively corresponds to the public key that is encryptically stored within the session packet.

As is indicated by step 110, client 30 generates an authorization packet. To accomplish this, client 30 utilizes the pre-established encryption component associated with client 30 to decrypt the session packet. Accordingly, client 30 then has access to the generated (and illustratively but not necessarily unique) public key. Client 30 retrieves biometric information from the user seeking access and generates an authentication model based on that information. The authentication model and the session number illustratively comprise at least two parts of the authorization packet. The authorization packet is encrypted in accordance with the public key taken from the session packet.

Next, the encrypted authorization packet is transmitted to the authentication module. There, the retained private key is utilized to decrypt the authorization packet, which was encrypted with a corresponding public key (the public key previously transferred within the session packet). As is indicated at step 112, the retained session number is compared to the received session number to be sure that the two values match. A check is made to be sure that the received session number was received within a proper predetermined time frame (e.g., as measured from the moment the session number was created). If the session number does not match or wasn't received in time, then the authentication model is not utilized for any subsequent purpose.

Assuming the session numbers do match and timing is adequate, and that the generated private key can decrypt the data, the authentication model is then utilized to perform a task, such as authentication model matching (i.e., database comparison) or template registration into a database. The session packet and/or the authorization packet could illustratively be formatted to include a command element that corresponds to the task that is supposed to be performed.

After the task has been completed, as is indicated by block 114, the authentication module transmits a result to the application module 32 at step 114. The result might be, but is not limited to, an indication that enrollment registration is complete, or a positive or negative match indication.

V. Application within a Network Environment

Figure 5:
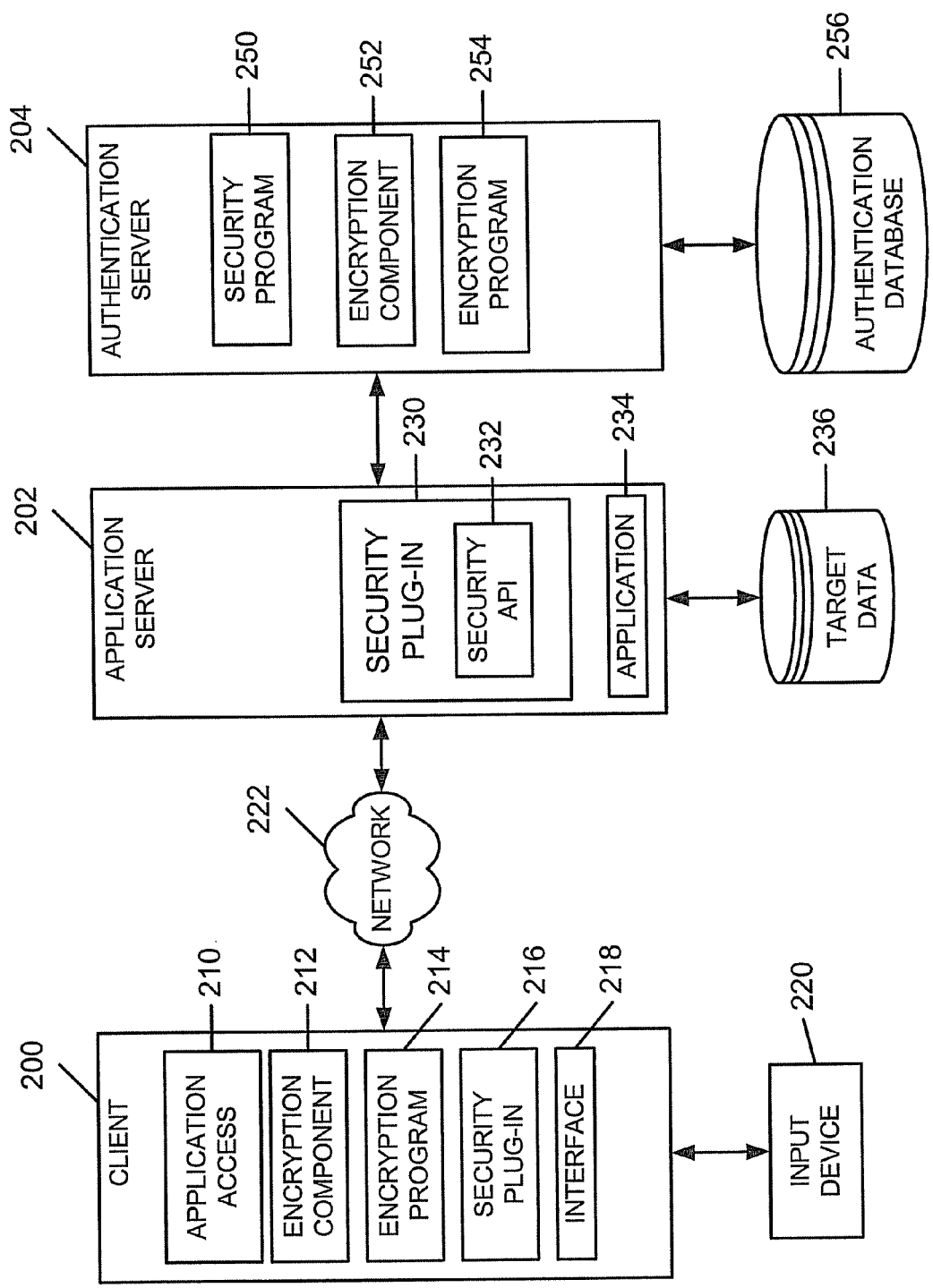
FIG. 5 is a schematic diagram illustrating a particular illustrative environment that includes a distributed network of computers.

One useful environment for the method illustrated in FIG. 4 is within a distributed network of computers, such as the Internet. FIG. 5 illustrates such an exemplary environment. The exemplary environment includes a client 200, application server 202 and authentication server 204.

Client 200 includes application access 210, encryption component 212, encryption program 214, security plug-in 216 and input device interface 218. Input device 220 can be a fingerprint reader or scanner as described above or some other biometric information receiver. Input device 220 interfaces with client 200 via user input interface 218. Client 200 is connected to application server 202 via network 222 which may illustratively be the Internet, a LAN, or another network system.

Application server 202 includes security plug-in 230, which has a security application program interface 232. Application server 202 also includes application 234. Application server 202 further has access to target data 236 using application 234.

Authentication server 204 includes security program 250, encryption component 252 and encryption program 254. Authentication server 204 has access to authentication database 256.

Client 200 includes encryption component 212 corresponding to encryption component 252 stored on authentication server 204. In one embodiment, encryption program 254 generates a PKI key pair. Encryption component 252 holds the private key portion for later decryption of a returning session packet, and returns the public key portion for use by the encryption component 214. This process is described in greater detail below. Security program 250 generally utilizes encryption component 252 and encryption program 254 to encrypt certain communications to client 200. Client 200 utilizes encryption component 212 to decrypt those communications, which uses encryption component 212 and encryption program 214.

In the FIG. 5 exemplary environment, it is assumed that client 200 wishes to access target data 236, which is accessible through application 234 on the application server 202. Access to target data 236 is illustratively secured and reserved for authorized access only. Client 200 includes application access 210, which allows client 200 to access application 234. For example, application access 210 is a web browser and application 234 is a website. Target data 236 might be personal information, such as bank account or medical record information. Assuming he or she is authorized to do so, and can adequately prove such authority, then a user can utilize client 200 to access target data 236. When a user instructs client 200 to request access to target data 236, security plug-in 230, in cooperation with security application program interface 232, requests security program 250 to begin an authorization session.

Figure 6:
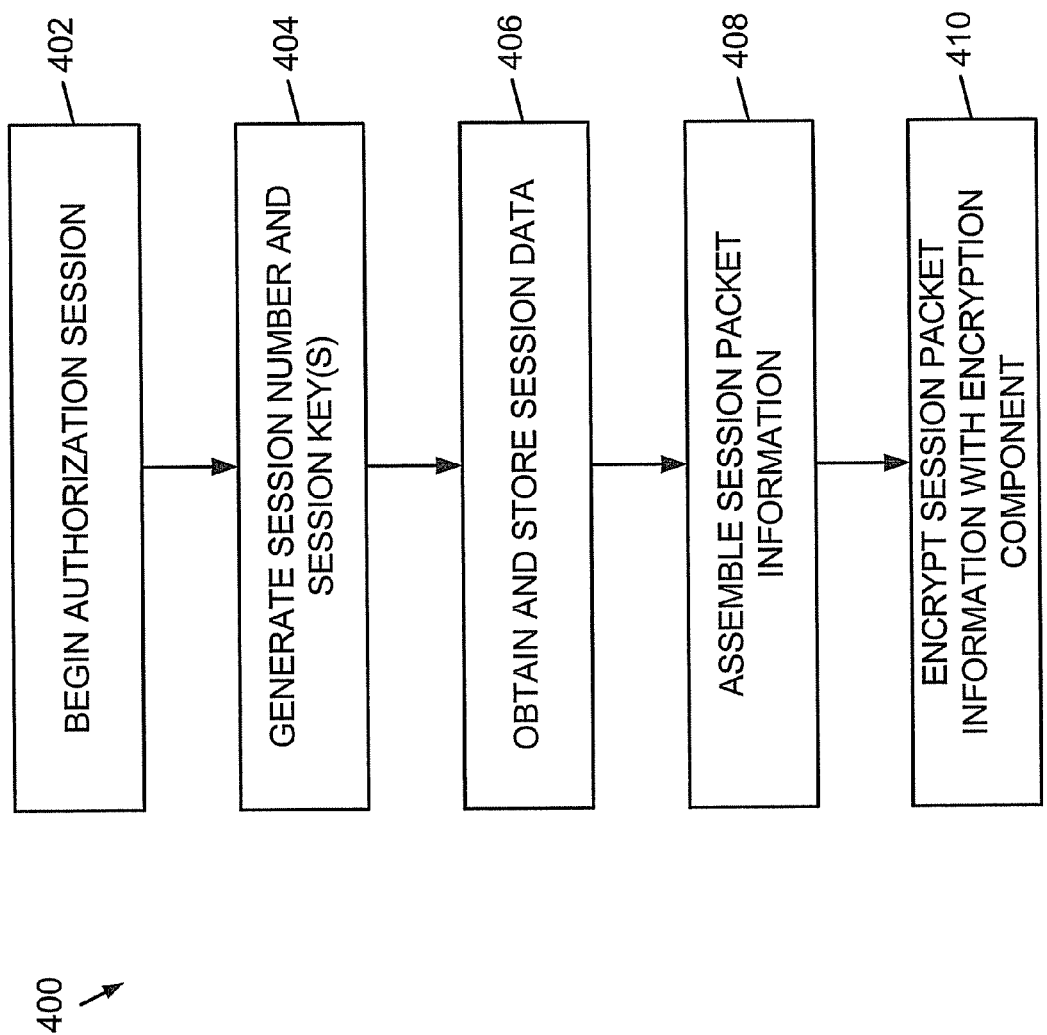
FIG. 6 is a flow diagram illustrating creation of a session packet.

Authorization server 204 generates a session packet according to method 400 illustrated in FIG. 6. At step 402, authorization server 204 initiates an authorization session. Next, a session number and session key (a public/private key pair) is generated at step 404. At step 406, session data (e.g., the session number and a time stamp) is stored. A private key that corresponds to the public session key is stored for later decryption of data sent from client 200. Session packet information is assembled at step 408. Next, at step 410, the session packet information is encrypted using encryption component 252 in encryption program 254.

Figure 7:
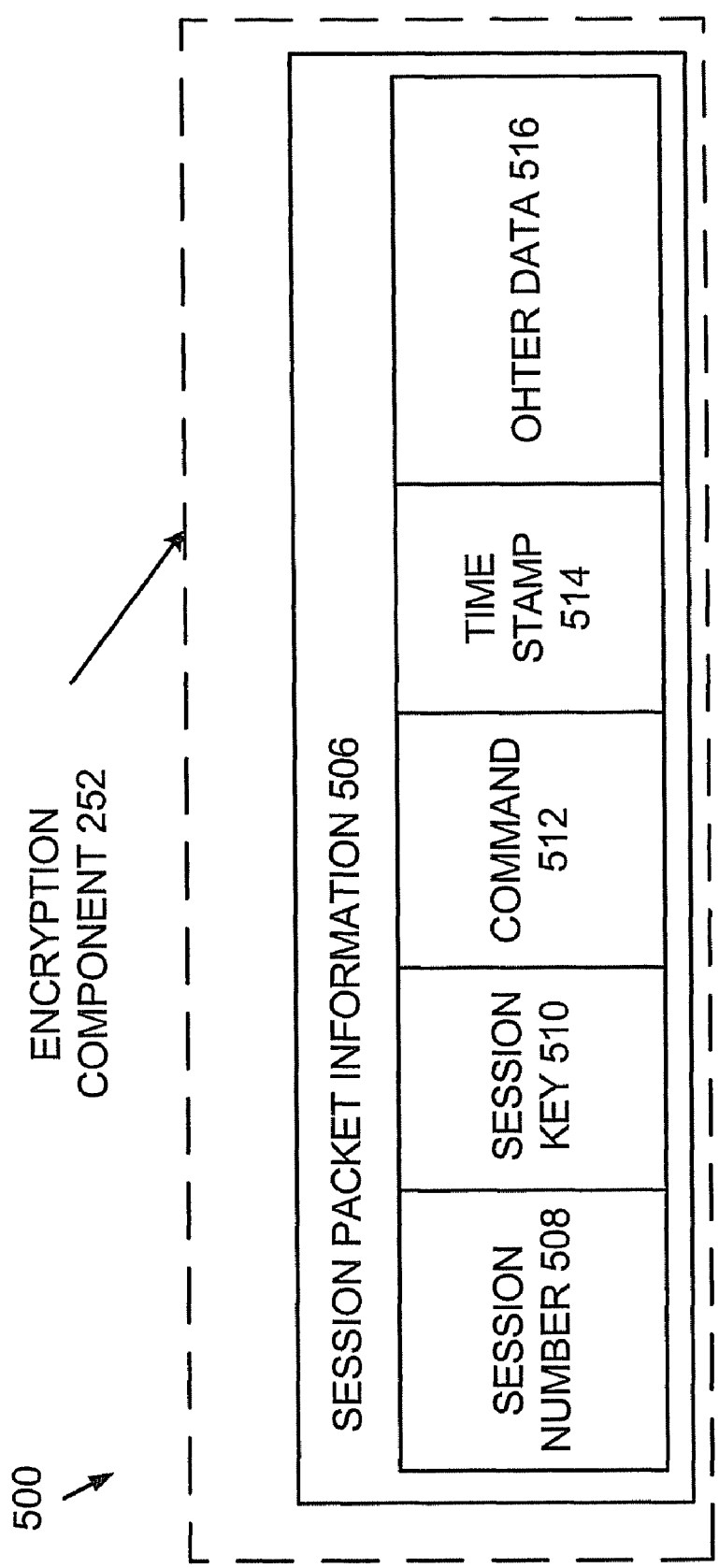
FIG. 7 is a diagrammatic view of a session packet.

As a result of the steps of method 400, a session packet 500, illustrated in FIG. 7, is generated. As illustrated, session packet 500 is encrypted with encryption component 252 and is then ready to be transmitted to client 200. Session packet 500 includes session packet information 506, which illustratively includes session number 508, session key 510 (public key), command 512 (optional element), time stamp 514 and other data 516.

Session number 508 is illustratively a non-sequentially generated number that is unique to a particular session. Session key 510 (public key) can also be unique to a particular session but does not have to be. However it can be more secure when it is unique. Whether or not the public key does vary, it is important that a corresponding private key also be accessible to the authentication server 204. Command 512 is indicative of what command (i.e. compare or enroll) a client 200 should facilitate. Timestamp 514 is a time value indicative of a time associated with the session initiation. Other data 516 may also be provided with session data 506. After session packet 500 is assembled and encrypted in accordance with encryption component 252, it is transmitted to client 200.

Figure 8:
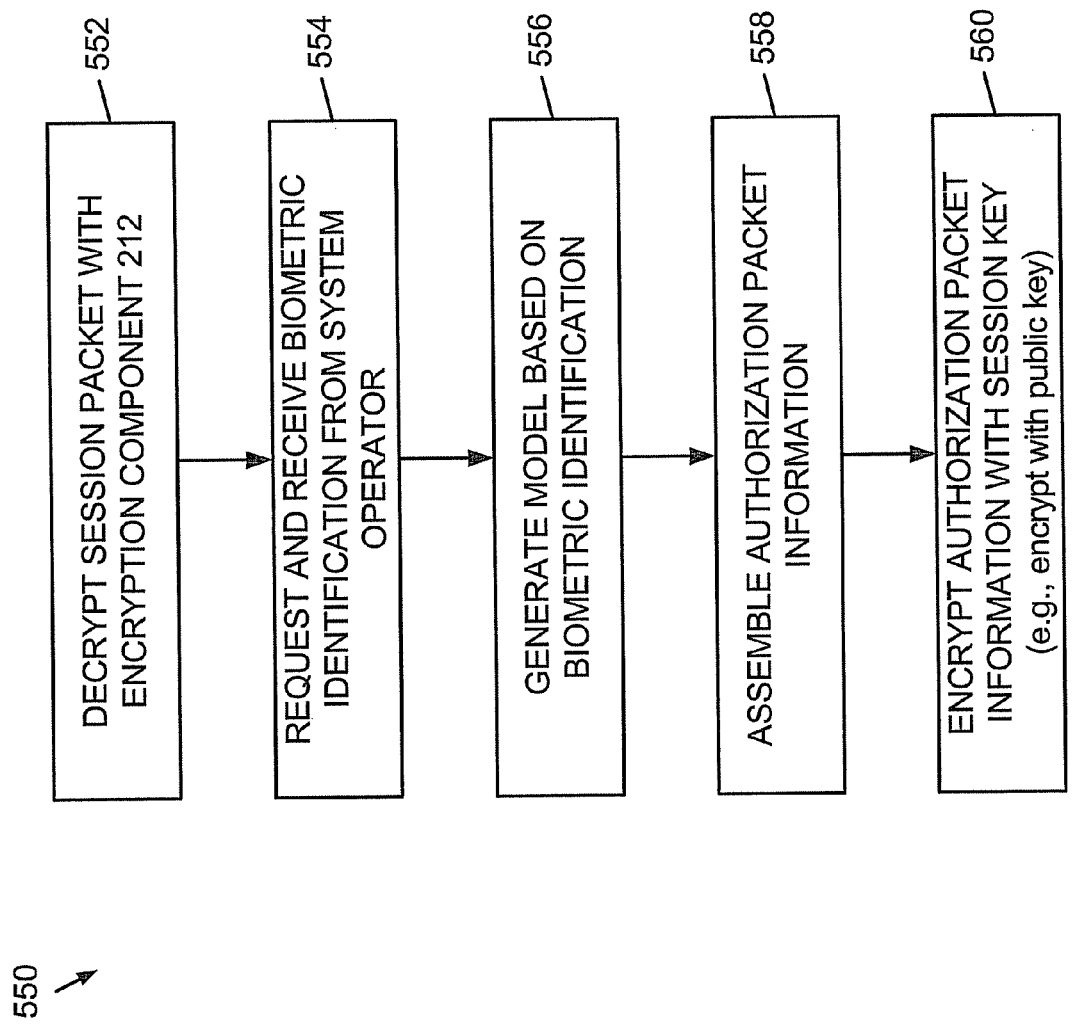
FIG. 8 is a flow diagram illustrating creation of an authorization packet.

Once client 200 receives session packet 500, client 200 performs method 550 illustrated in FIG. 8. The method includes decrypting the session packet at step 552. This decrypting is completed using an encryption component, in particular, encryption component 212 illustrated in FIG. 5. Once the session packet is decrypted, client 200 will request and receive biometric identification from a user based on the command received in a session packet. In one mode of operation, the user will perform a fingerprint scan utilizing reader 12. At step 556, an authentication model is generated. At step 558, authorization packet information is assembled. The authorization packet information includes the session number sent in the session packet and the authentication model generated in step 556. Once the authorization packet information is assembled, the information is encrypted with the session key (public key) sent in session packet 500. This is completed in step 560.

Figure 9:
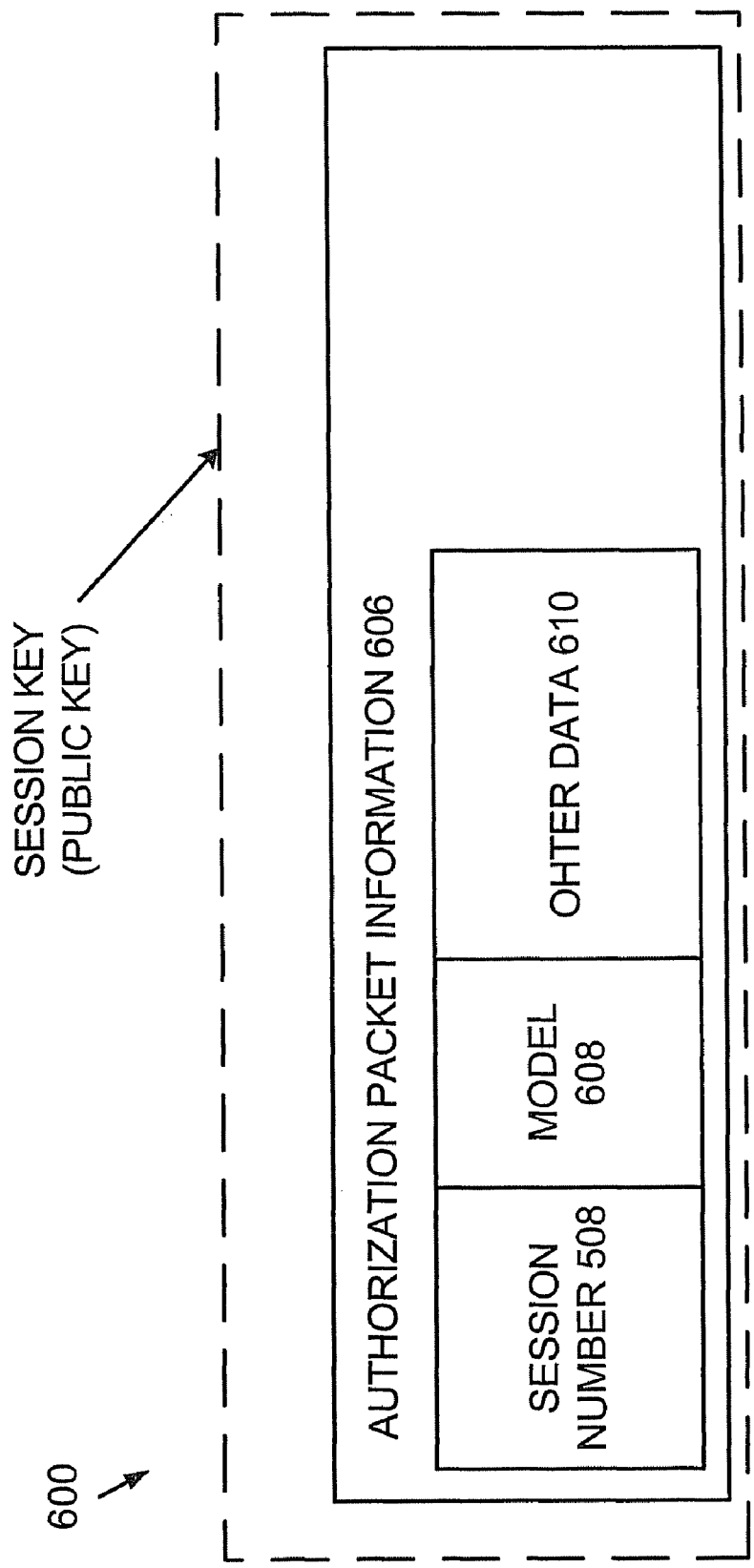
FIG. 9 is a diagrammatic view of an authorization packet.

FIG. 9 illustrates authorization packet 600. Authorization packet 600 is encrypted with session key (the public key) and includes authorization packet information 606. Authorization packet information 606 includes session number 508, authentication model 608 and other data 610. Once authorization packet 600 is assembled, it is transmitted to authentication server 204 via application server 202.

Figure 10:
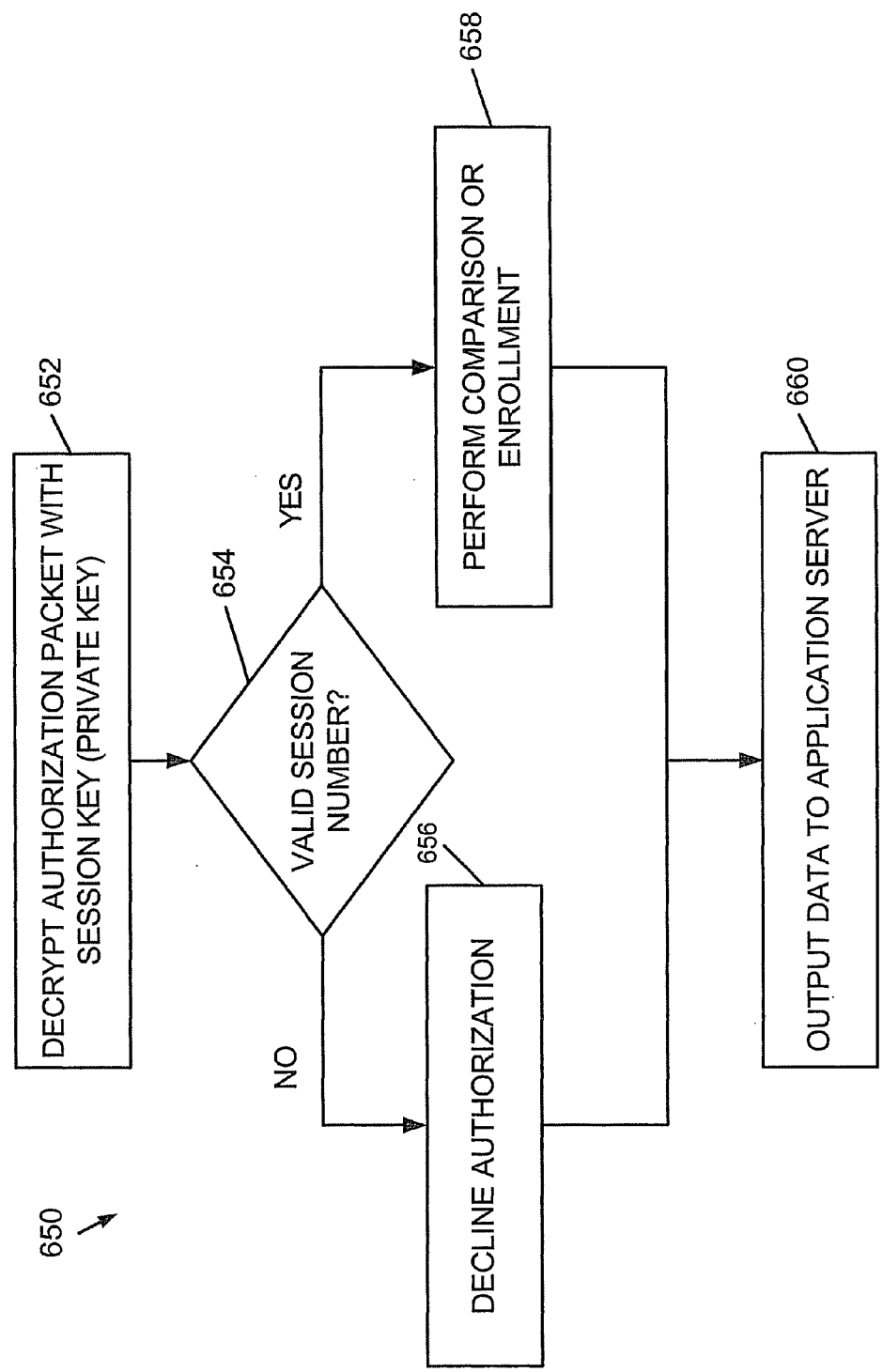
FIG. 10 is a flow diagram illustrating evaluation of an authorization packet.

Once authentication server 204 has received authorization packet 600, method 650, illustrated in FIG. 10, is performed. Initially, the authorization packet 600 is decrypted utilizing the retained session key (the private key) at step 652. Next, at step 654, the session number is validated. In order to provide enhanced security, the authorization may be declined if the session number is not valid, for example, if it does not match the retained value, or, if the authorization packet was not received within a specified amount of time. Authorization is declined at step 656 and output data is sent to the application server indicative of a decline in authorization at step 660. If a valid session number is received, the method performs a comparison or enrollment at step 658. Once the comparison or enrollment is performed, output data is sent to the application server at step 660. As described earlier, the output data sent at step 660 may be a variety of different types of information. In one mode, the output is a decline or acceptance of authorization. In another mode, data associated with a user may be sent, for example a credit card authorization based on a user's records.

In the data processing systems described herein, it is advantageous to carry out sensitive computing functions such as encryption/decryption and storage of encryption keys within a secure sub-system that is separate from the operating platform. In one embodiment, embedded security components are utilized to discourage access to secure data by unauthorized users who gain access to the operating platform.

Figure 11:
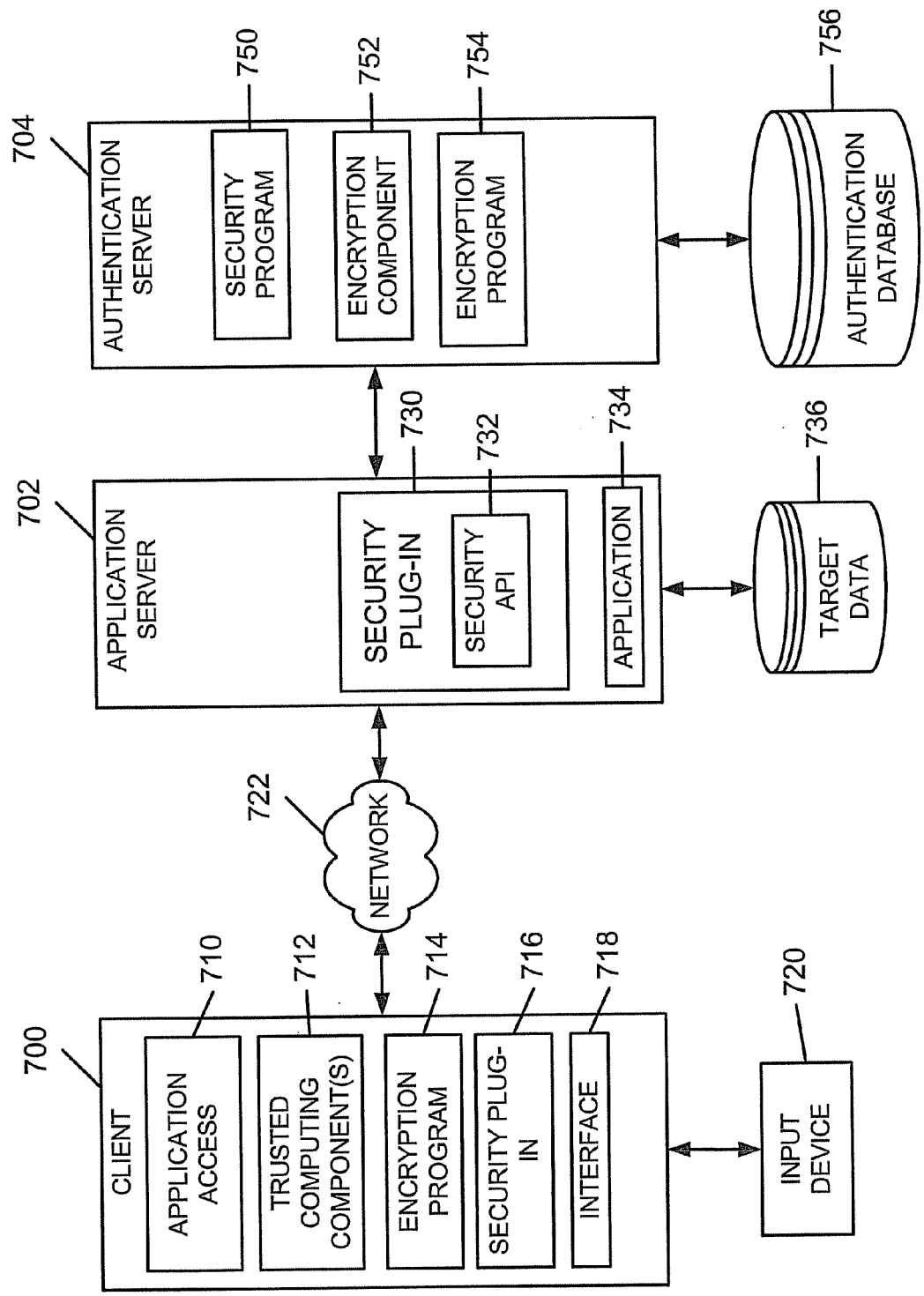
FIG. 11 is a schematic diagram of a particular illustrative environment that includes a trusted computing component.

With that introduction in mind, FIG. 11 illustrates an exemplary environment for employing methods for enhancing security within a biometric security system. The exemplary environment includes a client 700, application server 702 and authentication server 704 that are similar to client 200, application server 202 and authentication server 204 described with relation to FIG. 5. It is important to note that the systems and methods discussed below can be employed with regard to systems and methods previously described above. For example, trusted computing component(s) configured to enhance system security described with relation to client 700 can be employed in the environments illustrated with regard in FIG. 5.

Client 700 includes application access 710, trusted computing component(s) 712, encryption program 714, security plug-in 716 and input device interface 718. Input device 720 can be a fingerprint reader or scanner as described above or some other biometric information receiver. Input device 720 interfaces with client 700 via user input interface 718. Client 700 is connected to application server 702 via network 722 which may illustratively be the Internet, a LAN, or another network system.

Application server 702 includes security plug-in 730, which has a security application program interface 732. Application server 702 also includes application 734. Application server 702 further has access to target data 736 using application 734.

Authentication server 704 includes security program 750, encryption component 752 and encryption program 754. Authentication server 704 has access to authentication database 756.

Client 700 includes trusted computing component 712 to facilitate data processing, data storage, and/or various encryption or decryption functions in an enhanced security environment. In one example, trusted computing component 712 is configured to generate encryption keys. In another example, component 712 is configured to decrypt data received by client 700. In another example, component 712 is configured to encrypt data to be sent by client 700. In yet another example, component 712 is configured to store encryption keys in a state of heightened security within client 700.

Figure 12:
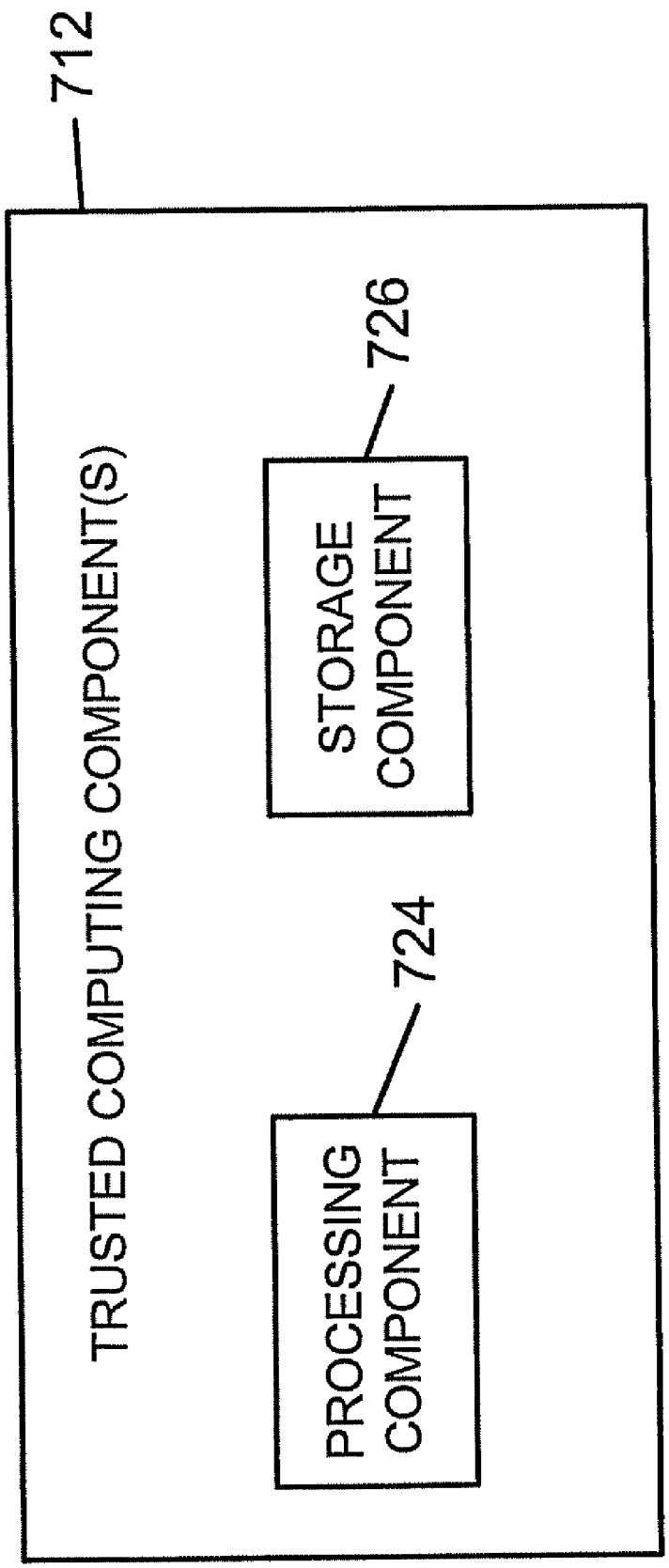
FIG. 12 is a diagrammatic view of an exemplary trusted computing component.

Trusted computing component 712 can be any security component configured to perform trusted computing. FIG. 12 illustrates one embodiment of trusted computing component 712. Component 712 is a hardware-based security component (e.g., a chip) that includes a processing component 724 and storage component 726. Component 712 can be configured to implement software components such as, but not limited to, encryption program 714 or security plug-in 716.

In one embodiment, processing component 724 is configured to carry out encryption/decryption operations. Further, in one embodiment, processing component 724 can be configured to provide and limit access to trusted computing component 712. Storage component 726 can be any component for storing data such as encryption keys or encryption functions. However, any data other than encryption information can also be stored and/or processed within trusted computing component 712. In one example, processing component 724 operates as a gateway to encryption keys stored in storage component 726. Processing component 724 can be configured to allow access to particular functions and data of client 700 while denying access to unauthorized users (e.g., hackers) who may be attempting to steal sensitive information. In this manner, encryption information within client 700 can be kept in a secured state within trusted computing component(s) 712. Further, data received from component(s) 712 can have a higher level of assurance associated therewith as functions and storage have been carried out within a secured operating environment.

As mentioned above, in one embodiment trusted computing component 712 comprises a hardware-based security system such as a discrete, embedded security chip configured to perform encryption and data security functions. Component(s) 712 can also comprise a plurality of hardware chips. Examples of embedded security chips are the Embedded Security Subsystem (ESS) and the Embedded Security Chip by International Business Machines (IBM) Corporation, Armonk, N.Y. Examples of functions that may be performed by security chips include data authentication and encryption, storage of encrypted passwords, hardware key storage, multi-factor authentication, local file encryption, and enhanced VPN security.

In one embodiment, trusted computing component(s) 712 comply with the trusted computing standards set forth by the Trusted Computing Group (TCG) (www.trustedcomputing-group.org), herein incorporated by reference in their entirety. When employed within trusted computing block 712, the above-described hardware security components can operate to prevent unauthorized access to sensitive data stored within block 712. In other words, an enhanced layer of security is provided between client 700 and data (e.g., encryption information) stored therein.

In another embodiment, trusted computing component 712 is a Trusted Platform Module (TPM). TPMs are known in the art and comprise microcontrollers that store keys, passwords, and/or digital certifications. The design of the TPM discourages external attacks and theft of information. In one example, the TPM complies with the specification for secured computing developed by the Trusted Computing Group (TCP), mentioned above. In this embodiment, trusted component 712 provides layers of security within client 700 as unauthorized users who gain access to client 700 would not necessarily gain access to information or data such as encryption keys within component 712.

In another embodiment, client security system 700 and trusted computing component 712 operate as a Trusted Computing Platform (TCP). TCPs are known in the art and provide enhanced security in data processing systems. Architecturally, TCPs are typically platforms modified by the addition of hardware (i.e., a chip). In one example, an embedded security chip (i.e., a chip), such as those mentioned above, is utilized. TCPs can also have extra firmware, extra software, and enhanced operating systems. Examples of TCP specifications (i.e., trusted computing standards) have been developed by the Trusted Computing Group (TCG). In a TCP, a set of unconditionally trusted functions (called a root-of-trust) are inserting into the platform. The root-of-trust needs to be able to supply evidence about the software state of the platform. The TCP provides reliable information about the platform and current software processes.

In one embodiment, trusted computing component 712 is configured to store encryption keys.

In another embodiment, trusted computing component 712 provides memory curtaining to discourage unauthorized access to encryption information stored within client 700. Component(s) 712 provide hardware storage locations for encryption information within client 700. In this manner, the encryption information is essentially isolated from other data and applications within client 700. Thus, the encryption information can secure from an unauthorized user or intruder who accesses client operating system 700.

In one example, trusted computing component 712 stores an encryption component corresponding to an encryption component 752 associated with authentication server 704. For example, a pre-established encryption relationship (i.e., a key pair) can be created between authentication server 704 and client 700. A first key portion (i.e., a public key) is stored within authentication server 704. A second key portion (i.e., a private key) is stored within trusted computing component 712. By storing the private key within component 712, increased security is provided for encrypted data sent from the authentication module. In other words, an unauthorized third party that gains access to (i.e., hacks into) client security system 700 would not necessarily gain access to the pre-established encryption key.

In another example, encryption program 754 generates a PKI key pair. Encryption component 752 holds the private key portion for later decryption of a returning authorization packet. The public key portion is stored in a session packet that is encrypted and transmitted to the client security system 700. The client security system 700 decrypts the session packet. The public key is obtained from the session packet and stored with trusted computing component(s) 712 for later use.

In another embodiment, trusted computing component 712 is configured to decrypt data. In one example, a remotely transmitted data packet is received by client 700. Trusted computing component 712 utilizes a decryption component to decrypt the session packet. The decryption component can be stored within component 712 or, alternatively, elsewhere within client 700. In this embodiment, decryption is performed substantially, if not entirely, within trusted component 712.

In another embodiment, trusted computing component 712 is configured to encrypt data. In one example, an authorization packet is encrypted by component 712 utilizing a session key contained in a remotely transmitted data packet received by client 700. Again, in this embodiment, encryption is performed substantially, if not entirely, within trusted component 712.

Trusted component(s) 712 include cryptographic functions for signing, encrypting or decrypting data. However, trusted component(s) 712 do not necessarily provide an external interface to these cryptographic processes. When data is transferred, the data can be 'signed', thus providing increased assurance as to the source of the data. Trusted component(s) 712 can include the functionality of encryption program 714 and can generate and store encryption keys.

It is important to note that trusted computing component(s) 712 can be any means (i.e., mechanism, device, system, etc.) for discouraging unauthorized access to or tampering with data stored therein. Further, any hardware devices configured to perform cryptographic operations solely from within a system, thus providing a secure environment to store and access confidential data are within the scope of the present invention. Trusted computing component(s) 712 are not limited to the particular systems and devices discussed herein.

Although the present invention has been described with reference to preferred embodiments, workers skilled in the art will recognize that changes may be made in form and detail without departing from the spirit and scope of the invention.

What is claimed is:

1. A computer-implemented method for regulating user access in the context of a biometric security system, the method comprising:

storing a first encryption component upon a client security system, the first encryption component corresponding to a second encryption component stored in a location remote from the client security system, wherein one of the first and second encryption components is configured to decrypt information that has previously been encrypted utilizing the other of the first and second encryption components;

receiving a remotely transmitted data packet at the client security system, the data packet containing an encryption key, a unique session number, a timestamp, and a command that indicates a task to be performed;

utilizing a computer processor, which is a component of a computing device upon which the client security system is implemented, to decrypt the data packet with the first encryption component;

determining the task to be performed based at least in part on the command;

requesting a collection of biometric data based on the determined task;

receiving the collection of biometric data from a biometric reading device associated with the client security system;

utilizing the computer processor to perform an image qualification test on the collection of biometric data, the image qualification test determining whether the collection of biometric data is fraudulent or of insufficient quality and the image qualification test providing feedback corresponding to inadequacies identified during the determination of whether the collection of biometric data is fraudulent or of insufficient quality; and utilizing the computer processor to encrypt the collection of biometric data, the unique session number, and the timestamp with the encryption key included in the data packet based at least in part on the collection of biometric data successfully passing the image qualification test.

2. The method of claim 1 wherein utilizing the computer processor to decrypt the data packet with the first encryption component comprises:

obtaining the first encryption component from a storage location that is an integrated part of trusted computing components maintained on a client computing device.

3. The method of claim 2 wherein the trusted computing components include an embedded security chip.

4. The method of claim 2 wherein the trusted computing components include implementation of a Trusted Computing Platform (TCP).

5. The method of claim 2 wherein the trusted computing components include implementation of a Trusted Platform Module (TPM).

6. The method of claim 2 wherein utilizing the computer processor to decrypt the data packet with the first encryption component comprises utilizing the first encryption component to decrypt the data packet using a pre-established decryption relationship between the client security system and a remotely deployed authentication module.

7. The method of claim 2 wherein utilizing the computer processor comprises utilizing a private key that is complimentarily related to the encryption key used to encrypt the data packet.

8. The method of claim 2 wherein the encryption key contained in the data packet is unrelated to the first encryption component utilized to decrypt the data packet.

9. The method of claim 2 wherein the data packet contains session data associated with a user access session initiated within the client security system.

10. The method of claim 9 wherein the unique session number is a non-consecutively generated number.

11. The method of claim 9 wherein the time stamp is utilized to determine whether the collection of biometric data is received within a predetermined time period.

12. A method for regulating user access in the context of a biometric security system, the method comprising:

initiating a match template registration session;

receiving a first data packet at the client security system from a remote server, the data packet containing a first encryption key that corresponds to a second encryption key stored in said remote server, one of the first and second encryption keys being configured to decrypt information that has previously been encrypted utilizing the other of the first and second encryption keys;

utilizing a computer processor, which is a component of a computing device upon which the client security system is implemented, to perform a first encryption function so as to encrypt a first collection of biometric information, the first encryption function comprising an application of the first encryption key to the first collection of biometric information;

initiating an authorization model matching session based upon the client security system requesting access to information stored on the remote server, the authorization model matching session being configured to open upon initiation and close after a predetermined time period;

receiving a second data packet at the client security system from the remote server, the second data packet containing a third encryption key that corresponds to a fourth encryption key stored in said remote server, one of the third and fourth encryption keys being configured to decrypt information that has previously been encrypted utilizing the other of the third and fourth encryption keys;

utilizing the computer processor to perform a second encryption function so as to encrypt a second collection of biometric information, the second encryption function comprising an application of the third encryption key to the second collection of biometric information; and granting or not granting the access to the information stored on the remote server based at least in part on whether or not the encrypted second collection of biometric information is transferred from the client security system to the remote server before expiration of the predetermined time period and based at least in part on a comparison of a match template generated from the first collection of biometric information to an authentication template generated from the second collection of biometric information.

13. The method of claim 12, wherein the comparison of the match template to the authentication template is performed utilizing an authentication server that is a different server than the remote server.

* * * * *